United States Patent
Huang et al.

(10) Patent No.: US 7,795,835 B2
(45) Date of Patent: Sep. 14, 2010

(54) STEP MOTOR DRIVING APPARATUS

(75) Inventors: Teng-Tsung Huang, Taipei Hsien (TW);
Guo-Jun Yu, Shenzhen (CN);
Hua-Yong Xu, Shenzhen (CN); De-Hua Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 330 days.

(21) Appl. No.: 11/949,055

(22) Filed: Dec. 3, 2007

(65) Prior Publication Data
US 2009/0039821 A1    Feb. 12, 2009

(30) Foreign Application Priority Data
Aug. 7, 2007    (CN) .......................... 2007 1 0201296

(51) Int. Cl.
*H02P 8/00* (2006.01)
(52) U.S. Cl. ...................................... 318/696; 318/685
(58) Field of Classification Search .............. 318/696, 318/685
See application file for complete search history.

(56) References Cited

U.S. PATENT DOCUMENTS

| 4,139,888 | A | * | 2/1979 | Salmon ........................ 700/9 |
| 4,262,221 | A | | 4/1981 | Dingwall |
| 7,247,848 | B2 | * | 7/2007 | Nakasuji et al. ............. 250/306 |

FOREIGN PATENT DOCUMENTS

CN    2781644 Y    5/2006

* cited by examiner

*Primary Examiner*—Bentsu Ro
*Assistant Examiner*—Erick Glass
(74) *Attorney, Agent, or Firm*—Jeffrey T. Knapp

(57) ABSTRACT

A step motor driving apparatus includes a micro control unit (MCU), a pulse generator, a first step motor driver, a second step motor driver, and a communication port. The first step motor driver is configured for driving a first step motor and connected to the MCU. The second step motor driver is configured for driving a second step motor and connected to the MCU. The MCU is connected to the second step motor driver via the pulse generator. The pulse generator is configured to supply pulse signals to the second step motor driver. The communication port is connected to the MCU. The MCU receives a corresponding command from an external control apparatus via the communication port. The MCU selectively controls the first step motor driver to drive the first step motor or controls the second step motor driver to drive the second step motor according to the command.

7 Claims, 1 Drawing Sheet

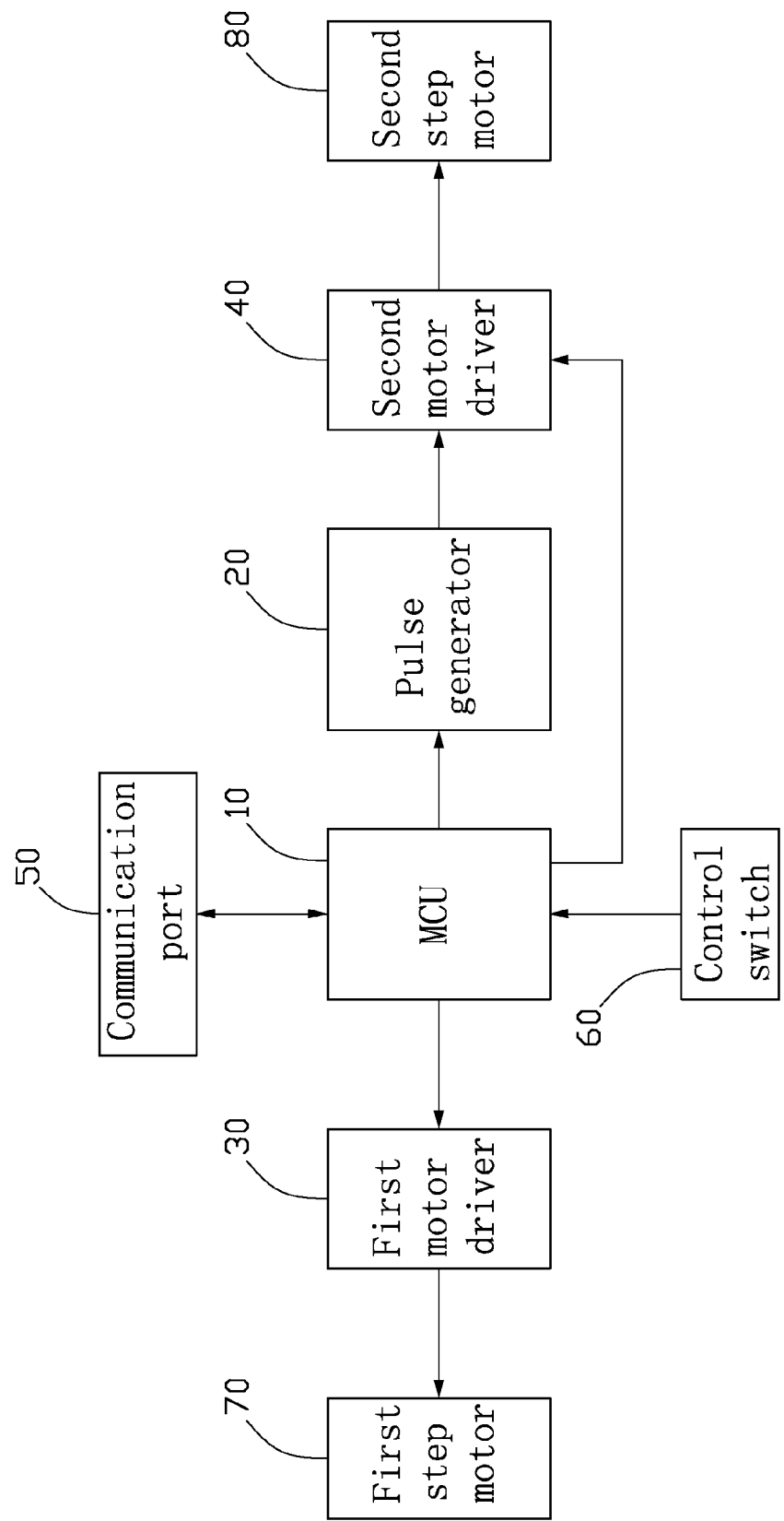

STEP MOTOR DRIVING APPARATUS

BACKGROUND

1. Field of the Invention

The present invention relates to step motor driving apparatuses, and particularly to a step motor driving apparatus which can selectively drive two types of motors according to need.

2. Description of Related Art

Generally speaking, there are two types of step motor drivers; low-powered step motor driver and high-powered step motor driver. The low-powered step motor driver can directly drive a low-powered step motor. The high-powered step motor driver can drive a high-powered step motor via a pulse generator supplying pulse signals thereto.

However, the high-powered step motor driver can not drive the low-powered step motor, and the low-powered step motor driver can not drive the high-powered step motor. If users need selectively apply the low-powered and high-powered step motors, they must respectively use the low-powered step motor driver and high-powered step motor driver, which is very inconvenient.

What is needed is to provide a step motor driving apparatus which can selectively drive two types of motors according to need.

SUMMARY

An embodiment of a step motor driving apparatus includes a micro control unit (MCU), a pulse generator, a first step motor driver, a second step motor driver, and a communication port. The first step motor driver is configured for driving a first step motor and connected to the MCU. The second step motor driver is configured for driving a second step motor and connected to the MCU. The MCU is connected to the second step motor driver via the pulse generator. The pulse generator is configured to supply pulse signals to the second step motor driver. The communication port is connected to the MCU. The MCU receives a corresponding command from an external control apparatus via the communication port. The MCU selectively controls the first step motor driver to drive the first step motor or controls the second step motor driver to drive the second step motor according to the command.

Other advantages and novel features of the present invention will become more apparent from the following detailed description of an embodiment when taken in conjunction with the accompanying drawing, in which:

BRIEF DESCRIPTION OF THE DRAWING

The drawing is a block diagram of a step motor driving apparatus in accordance with an embodiment of the present invention.

DETAILED DESCRIPTION

Referring to the drawing, a step motor driving apparatus in accordance with an embodiment of the present invention includes a micro control unit (MCU) 10, a pulse generator 20, a first step motor driver 30, a second step motor driver 40, a communication port 50, and a control switch 60.

The MCU 10 is connected to the first step motor driver 30 (low-powered step motor driver) configured for driving a first step motor 70 (low-powered step motor). The MCU 10 is connected to the second step motor driver 40 (high-powered step motor driver) configured for driving a second step motor 80 (high-powered step motor). The MCU 10 is also connected to the second step motor driver 40 via the pulse generator 20 configured to supply pulse signals to the second step motor driver 40. The MCU 10 is also connected to the communication port 50, which is configured to connect to a control apparatus such as a computer (not shown), which is configured to control the MCU 10 to selectively drive the first step motor driver 30 or the second step motor driver 40. The control switch 60 is connected to the MCU 10 to start or stop the MCU 10.

In this embodiment, the MCU 10 is an 89C58 MCU. The first motor driver 30 is an A3901 motor driver. The second motor driver 40 is an A3967 motor driver. The pulse generator 20 is an 8254 programmable interval timer (PIT). The communication port 50 is a serial interface or a universal serial bus (USB) port. The control switch 60 is a button switch.

When a user needs to use the first step motor 70, the first step motor 70 is connected to the first motor driver 30. The user uses the control apparatus to transmit a corresponding command to the MCU 10, the MCU 10 will initialize parameters of the first motor driver 30, such as operation time, operation speed, etc., according to the command. Then the first motor driver 30 will drive the first step motor 70 according to the parameters thereof.

When a user needs to use the second step motor 80, the second step motor 80 is connected to the second motor driver 40. The user uses the control apparatus to transmit another corresponding command to the MCU 10, the MCU 10 will initialize parameters of the second motor driver 40, such as operation time, operation speed, etc., according to the command, and initialize parameters of the pulse generator 20, such as pulse signal frequency. Then the second motor driver 40 will drive the second step motor 80 according to the parameters thereof and the parameters of the pulse generator 20.

The step motor driving apparatus can selectively apply the first and second step motor drivers to drive the first step motor or the second step motor, which is very convenient.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A step motor driving apparatus comprising:
   a micro control unit (MCU);
   a pulse generator;
   a low-powered step motor driver configured for driving a low-powered step motor directly and connected to the MCU;
   a high-powered step motor driver configured for driving a high-powered step motor and connected to the MCU, the MCU connected to the high-powered step motor driver via the pulse generator, the pulse generator configured to supply pulse signals to the high-powered step motor driver; and
   a communication port connected to the MCU, the MCU receiving a corresponding command from an external control apparatus via the communication port, the MCU selectively controlling the low-powered step motor driver to drive the low-powered step motor or controlling the high-powered step motor driver to drive the high-powered step motor according to the command.

2. The step motor driving apparatus as claimed in claim 1, wherein a control switch is connected to the MCU to start or stop the MCU.

3. The step motor driving apparatus as claimed in claim 2, wherein the control switch is a button switch.

4. The step motor driving apparatus as claimed in claim 1, wherein the pulse generator is a programmable interval timer (PIT).

5. The step motor driving apparatus as claimed in claim 1, wherein the communication port is a serial interface.

6. The step motor driving apparatus as claimed in claim 1, wherein the communication port is a universal serial bus (USB) port.

7. The step motor driving apparatus as claimed in claim 1, wherein the external control apparatus is a computer.

* * * * *